United States Patent [19]

Griesbach et al.

[11] Patent Number: 4,823,961

[45] Date of Patent: * Apr. 25, 1989

[54] RECLOSABLE PACKAGE

[75] Inventors: Ray H. Griesbach, Monona; Gerald O. Hustad, McFarland, both of Wis.

[73] Assignee: Oscar Mayer Foods Corporation, Madison, Wis.

[*] Notice: The portion of the term of this patent subsequent to Nov. 8, 2005 has been disclaimed.

[21] Appl. No.: 218,388

[22] Filed: Jul. 12, 1988

Related U.S. Application Data

[63] Continuation of Ser. No. 841,916, Mar. 20, 1986, Pat. No. 4,782,951.

[51] Int. Cl.⁴ .................... B65D 75/26; B65D 81/20
[52] U.S. Cl. .................... 206/632; 206/484; 206/524.8; 383/61; 426/123; 426/127; 426/129
[58] Field of Search ............... 206/461, 484, 601, 604, 206/631, 631.1, 632, 633, 524.8; 383/61; 426/119, 123, 127, 129

[56] References Cited

U.S. PATENT DOCUMENTS

| | | |
|---|---|---|
| 2,978,769 | 4/1961 | Harrah .................... 24/201 |
| 3,181,583 | 5/1965 | Lingenfelter .................. 206/232 |
| 3,398,876 | 8/1968 | Ward .................... 206/631 |
| 3,647,485 | 3/1972 | Seiferth et al. .................. 426/127 |
| 3,650,386 | 3/1972 | Tigner .................... 206/631 |
| 3,740,237 | 6/1973 | Grindrod .................... 53/412 X |
| 3,746,215 | 7/1973 | Ausnit . |
| 3,910,410 | 10/1975 | Shaw . |
| 3,991,801 | 11/1976 | Ausnit . |
| 4,191,230 | 3/1980 | Ausnit . |
| 4,241,865 | 12/1980 | Ferrell .................... 383/61 |
| 4,246,288 | 1/1981 | Sanborn, Jr. .................... 426/122 |
| 4,252,238 | 2/1981 | Spiegelberg . |
| 4,260,061 | 4/1981 | Jacobs .................... 206/633 |
| 4,273,815 | 6/1981 | Gifford et al. .................. 426/127 X |
| 4,355,494 | 10/1982 | Tilman .................... 53/451 X |
| 4,405,667 | 9/1983 | Christensen et al. .......... 206/484 X |
| 4,415,084 | 11/1983 | Hauser et al. .................... 206/461 |
| 4,437,293 | 3/1984 | Sanborn, Jr. .................... 53/412 |
| 4,549,657 | 10/1985 | McMartin . |
| 4,574,951 | 3/1986 | Weaver .................... 206/461 |
| 4,617,683 | 10/1986 | Christoff .................... 53/451 X |
| 4,698,954 | 10/1987 | Behr . |
| 4,713,839 | 12/1987 | Peppiatt .................... 383/61 |
| 4,736,450 | 4/1988 | Van Erden . |
| 4,759,642 | 7/1988 | Van Erden et al. .................. 383/61 |
| 4,782,951 | 11/1988 | Hustad et al. . |
| 4,786,190 | 11/1988 | Van Erden . |

FOREIGN PATENT DOCUMENTS

| | | |
|---|---|---|
| 0239319 | 9/1987 | European Pat. Off. . |
| 2264729 | 10/1975 | France .................... 206/461 |
| 0143388 | 11/1979 | Japan .................... 206/484.2 |
| 0126059 | 9/1980 | Japan .................... 206/484 |
| 0105248 | 5/1982 | Japan . |
| 2029360A | 3/1980 | United Kingdom . |
| 2130173 | 5/1984 | United Kingdom .................. 383/61 |

Primary Examiner—Jimmy G. Foster
Attorney, Agent, or Firm—Joseph T. Harcarik; Daniel J. Donovan

[57] ABSTRACT

A reclosable package comprising interlocking closure strips positioned outside of a hermetic seal or seal area and the method for producing same. The hermetic seal is of the easy-open or peelaway type so as to not destroy the integrity of the package or closure strips upon opening of the package.

10 Claims, 2 Drawing Sheets

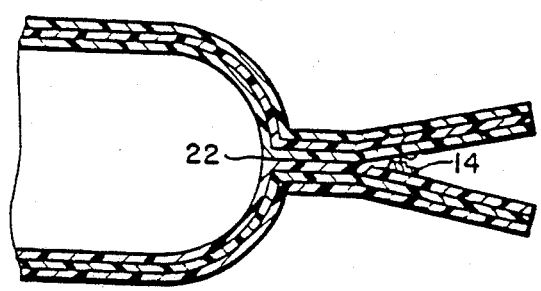
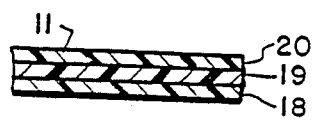
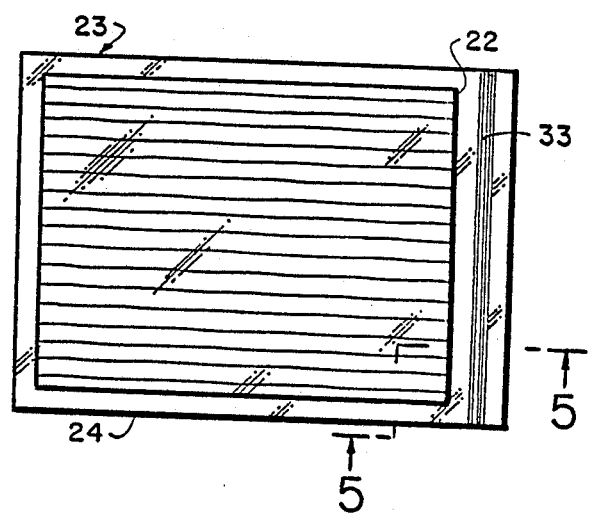
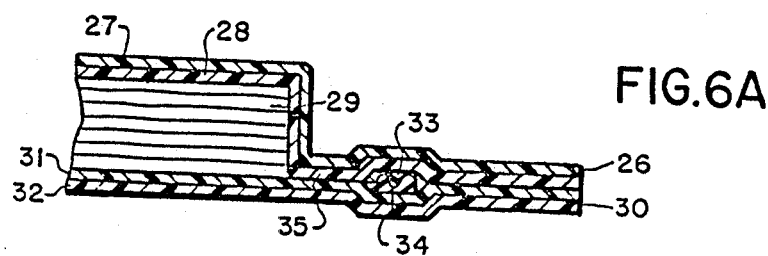

RECLOSABLE PACKAGE

This is a continuation of application Ser. No. 841,916, filed Mar. 20, 1986, now U.S. Pat. No. 4,782,951.

BACKGROUND OF THE INVENTION

1. Field of the Invention

This invention relates to a reclosable package and to a method for producing the same. More specifically this invention relates to a reclosable package for food products where the package is evacuated and hermetically sealed within an interlocking strip.

2. Description of the Prior Art

A substantial volume of cheese, bacon frankfurters, sliced luncheon meat and other processed meats are sold in packages which are formed from flexible thermoplastic materials. The freshness of the product within the package is to a large measure dependent upon the fact that the thermoplastic package is hermetically sealed and has been evacuated and, in some instances, gas flushed. However, in many instances, when an evacuated package of this type is purchased not all of its contents are used at once by the consumer. When the initial seal has been broken and part of the package removed it is difficult to reclose the package for satisfactory storage in a refrigerator; and, in order to preserve the contents in a fresh state without loss of flavor and texture, it is often necessary to completely repackage the product. To overcome this problem, there are many prior art package designs which offer means of opening and resealing but many of these have the disadvantage that wordy printed directions are needed and many times the thermoplastic packaging material is so stiff and so strong that even a carefully designed reclosure device can be destroyed.

Another problem which is encountered with prior art reclosable packages is the problem of manufacturing them at a commercially acceptable rate. Placing tear tabs, tear strips, or the like in combination with resealing means such as pressure sensitive adhesive strips calls for extreme care in registration and alignment of each of the packaging components and rather precise sealing must take place in order to achieve a satisfactory product. Accordingly, some manufacturers and methods for producing a reclosable package use what is commonly referred to as closure strips on each of the two inner surfaces of the packaging material. These closure strips consist of thermoplastic beads either extruded or attached to the packaging materials. These beads have an interlocking profile. Several patents in this area have been issued. However, the closure strip is always found within the confines of the hermetic seal of the package. Such a process means that the closure strip must be indented from the edge of the packaging material and after sealing the closure strip forms voids and pockets within the package and product cavity itself.

U.S. Pat. No. 4,246,288 and U.S. Pat. No. 4,437,293 describe a reclosable package and a method and apparatus for making such a reclosable package.

U.S. Pat. No. 3,647,485 describes a package and a method for making the same which has an improved hermetic breakaway or peelable seal formed between an ethylene-polar monomer polymer film or coating and a thermoplastic film.

U.S. Pat. No. 3,740,237 describes a continuous method of enclosing the product between a pair of films so as to provide a package having a product enclosing portion and a peripheral flange. The pair of films are joined to form a hermetic dual seal by applying a continuous strip of peelable bond adhesive through a portion of the film destined to become a peripheral flange and extending partially into that portion of the film destined to become the product enclosing portion and providing the remainder of the peripheral flange with means for permanently bonding the pair of films.

U.S. Pat. No. 4,273,815 describes an improved laminated film having at least one lamina of polyvinylidene chloride film adhered to at least one lamina of chlorinated polyethylene, and the method of forming this improved lamina, and to packages produced therewith. Polyvinylidene chloride films, commonly known as Saran, are used extensively in the packaging of food products and the like which are susceptible to deterioration by oxygen and other gases. This film is adequately flexible and effectively impermeable to air and oxygen. In addition, polyvinylidene chloride films exhibit unique properties in a so-called "supercooled" or amorphous condition during which these films can be readily formed around a product to be packaged without incurring undesirable folds, pleats or the like.

SUMMARY OF THE INVENTION

A reclosable package in accordance with the invention comprises a film having a cavity for holding foodstuffs, said film having an inner hermetic seal and an outer reclosable seal comprising two interlocking closure strips.

In one embodiment, a reclosable package in accordance with the invention comprises packaging material, a cavity in the packaging material for receiving product, an easy-open or breakaway seal in said packaging material for opening said package and providing access to said product cavity, and a reclosable seal peripheral to said easy open seal wherein said reclosable seal comprises interlocking closure strips.

In a further embodiment, a reclosable package according to the invention comprises: two layered, coextruded films of dissimilar arrangement which form an easy open peel seal upon intimate contact of two said films; a peripheral flange; product cavity; hermetic, easy-open, vacuum peel seal of from about 1.5 to about 6.0 pounds opening force adjacent to said product; and reclosable, flexible, thermoplastic, interlocking closure strips, said strips being adjacent and parallel to and extending substantially the length of one edge of each of said layered films, said strips being peripheral to said hermetic seal.

In accordance with the invention, a continuous method of enclosing a product between a pair of films to provide a film-package having a product-enclosing portion and a peripheral flange, a first inner portion of said films being readily separated when access to the product is desired and a second outer portion of said films being reclosable, comprises: moving said pair of films spaced apart and face to face along a line, said films including means for bonding opposing faces thereof to each other; applying near a marginal edge of each said pair of films reciprocally interlocking closure strips, said closure strips extending through that portion of the films destined to become a peripheral flange of said package; moving a product between said pair of films; drawing the films around the product to bring the films into contact with each other around the periphery of the product; bonding the films together around the periphery of the product, whereby a peelable bond is provided around a portion of the peripheral flange adjacent to said product and adjacent to said closure strips; and bonding together the opposing interlocking end portions of said closure strips on each of said pair of films. The last-mentioned step ensures that the interlocking ends of the closure strips remain in intimate engagement.

A further method of enclosing a product between first and second sheets of packaging material in accordance with the invention comprises: inserting a product between said first and second sheets of packaging material; attaching interlocking closure stirps or profiles on said first and second sheets adjacent to the areas of said first and second sheets destined to become a hermetic seal; contacting said first and second sheets with each other at a hermetic seal area adjacent to the product around the periphery of the product, said first and second sheets having respective opposed first and second adhering surfaces at the hermetic seal area, said first sheet of packaging material having said first adhering surface consisting essentially of a copolymer film material which is bonded directly to said second adhering surface of said second sheet of packaging material without an adhesive layer therebetween, at least at those portions of the seal area which are intended to be separated when access to the product is desired, said copolymer film material being formed of a mixture of ethylene and polar monomer having a polar monomer content in the range 10–40 percent by weight and said second adhering surface consisting essentially of a layer of polyvinylidene chloride copolymer film material, whereby there is formed immediately adjacent to the product, a hermetic seal which completely encloses said product between said first and second sheets of packaging material.

The first sheet may include an inner face of polyvinylidene chloride copolymer film material to which the surface of said ethylene-polar monomer copolymer film material opposite to said first adhering surface is directly bonded, and said second adhering surface may comprise a polyvinylidene copolymer film material formed by polymerization of a mixture including vinylidene chloride in an amount between 68 percent and 90 percent and vinyl chloride in an amount between 10 and 32 percent by weight, the vinylidene chloride content of the mixture from which the polyvinylidene chloride copolymer film material of the second adhering surface is formed being lower than the vinylidene chloride component of the mixture from which said polyvinylidene chloride copolymer film material of the first sheet is formed.

The ethylene-polar monomer copolymer film material and the second adhering surface may be heated to a temperature of from about 80° F. to 200° F. at the time of forming said hermetic seal by said contacting, whereby the tenacity of the seal is improved without destroying the breakaway property or peelability thereof.

The first adhering surface may be formed on an ethylene-vinyl acetate copolymer film, such as one which has a vinyl acetate content of from 15 percent to 20 percent by weight.

The second adhering surface may be formed of polyvinylidene chloride copolymer film which when initially contacted to said ethylene-vinyl acetate copolymer film material is in an amorphous supercooled state.

The improved packages of the present invention exhibit significant advantages in that they are generally characterized by a seal which closely conforms to the shape of the packaged product. This product-conforming seal has a number of significant advantages and is possible due to the placement of the closure strip away from the product cavity and outside the hermetic seal. For example, the unsightly appearance produced by the free movement of water and the product juices loosely contained in many conventional reclosable packages with the closure strip contained in the package product compartment is avoided. Furthermore, these packages provide a maximum seal area for a given product particularly where such product is of irregular shape thereby providing the maximum seal area afforded by a package of given size and likewise minimizing the amount residual oxygen present in such package. For these reasons and others the improved packages of the prevent invention are particularly suitable for the packaging of the food products such as weiners, frankfurters, bacon, sliced luncheon meat, chops, cheese and the like.

It is therefore, an important object of the present invention to provide an improved reclosable package characterized by closure strips capable of resealing the package and an inner hermetic, peelable breakaway seal which can be readily and easily separated when access to the contents of said package is desired.

Another object of the present invention is to provide a reclosable package which may be made on a single machine and straight through process rather than making a pouch on one machine and performing the filling, evacuating and sealing process on another machine.

Accordingly, another of the objects of the present invention is to provide a reclosable package which may be made rapidly and reliably.

Other and further objects of the present invention will be apparent from the following detailed description thereof taken in conjunction with the accompanying drawings.

BRIEF DESCRIPTION OF THE DRAWINGS

FIG. 4 is an enlarged fragmentary cross-sectional elevational view of the package illustrated in FIG. 1.

FIG. 5 is a fragmentary sectional view of a three ply laminate film embodied in the present invention.

FIG. 6 is a schematic plain view of a modified form of bacon package embodying principles of the present invention.

FIG. 6a is an enlarged fragmentary sectional view of the package shown in FIG. 6 taken along the line 5—5 therein.

DETAILED DESCRIPTION OF THE INVENTION

Figure 1:
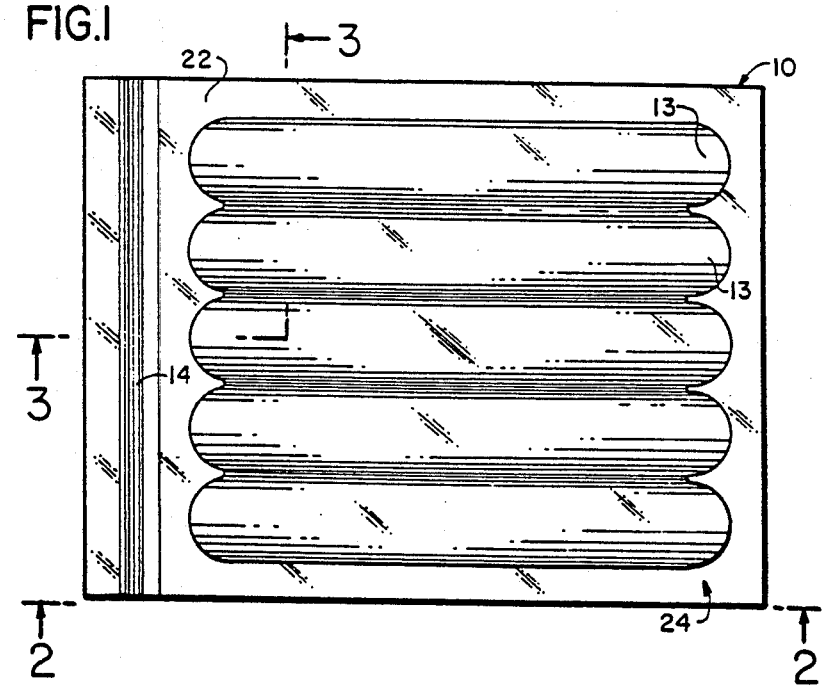
FIG. 1 is a plan view illustrating a preferred film product package in accordance with this invention.
Figure 2:
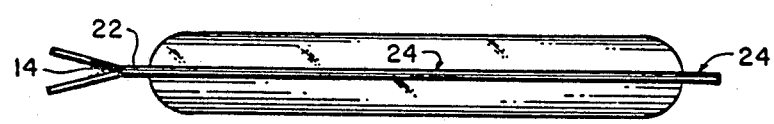
FIG. 2 is an elevational side view of the package illustrated in FIG. 1 viewed in the direction indicated by line 2—2.

In the detailed description of certain preferred embodiments of the present invention set out below, it will be noted that these packages generally include one or more laminae of a polyvinylidene chloride film. These polyvinylidene chloride films are not essential to the present invention in that suitable peelable or breakaway seals can be formed between ethylene-polar monomer copolymer films or coatings and other thermoplastic materials. There are, however, certain unique properties of polyvinylidene chloride films which, by reason of their own individual characteristics and cooperative characteristics exhibited with ethylene-polar monomer copolymer films and coatings, make these films particularly suitable for use in the improved packages of the present invention.

FIGS. 1-4 illustrate package 10 formed on top laminate 11 and bottom laminate 12 which cooperatively enclose therebetween a plurality of wieners or wiener shaped products 13. Laminates 11 and 12 are combined preferably about product 13 to form a continuous edge seal 22 and peripheral flange 24. The laminates are also drawn inwardly about the product to conform to the counter thereof to provide package 10 with improved rigidity for efficient handling.

Figure 3:
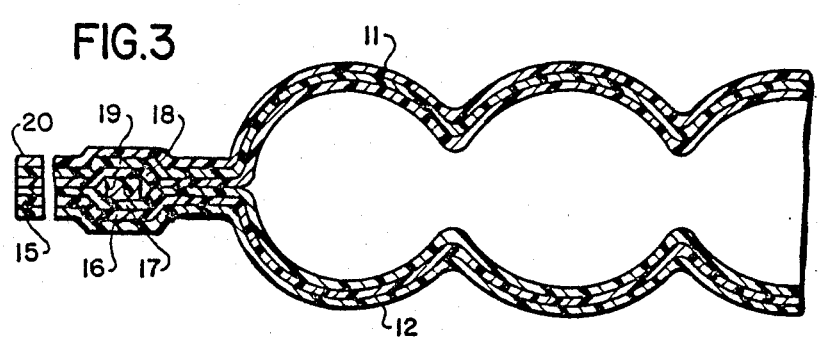
FIG. 3 is an enlarged fragmentary cross-sectional elevational view taken approximately along the line 3—3 of FIG. 1.

As best shown in FIG. 3 bottom laminate 12 is formed out of outer lamina 15 of plasticized polyvinyl chloride which is combined in adhering relationship with middle lamina 16 of ethylene-vinyl acetate which is in turn combined in adhering relationship with inner lamina 17 of Saran copolymer (polyvinylidene chloride). Top laminate 11, as shown in FIGS. 3 and 5 is similarly formed with outer plasticized polyvinyl chloride film 20 and middle Saran copolymer lamina 19 and inner ethylene vinyl acetate lamina 18. The Saran copolymer has generally crystalline structure with random crystal distribution throughout and provides suitable oxygen barrier properties. Typically a Saran copolymer film having a composition of approximately 85% vinylidene chloride and 15% vinyl chloride provides suitable oxygen barrier properties.

In accordance with the preferred aspect of the present invention hermetic seal barrier 22 between Saran copolymer lamina 17 and ethylene vinyl acetate lamina 18 can be readily separated by peeling back the top or bottom lamina 11 or 12 to gain access to the package. Thereafter closure strips 14 may be interlocked to reseal the package. Separation of the laminates, however, does not result in destruction of either of laminates 11 or of 12, or closure strips (or profiles) 14. To insure that the structural and functional integrity of the laminates, closure strips and remaining seals is maintained, it is critical that the opening forces of the easy-open or breakaway seal 22 be sufficient to withstand processing, handling and shipping yet low enough to allow access to the product. Therefore, it has been determined that the inner hermetic, easy-open seal 22 should have an opening force of from about 1.5 to about 6.0 pounds and preferably from about 2.5 to about 3.5 pounds.

FIGS. 6 and 6A illustrate a package embodying principles of the present invention which are particularly suited for packaging bacon strips and similar elongated meat products. In particular, package 23 provides a method by which the bacon product can be packaged. In particular, package 23 includes upper film lamination 26 composed of an outer oxygen barrier film lamina 27 and inner lamina 28 as well as interlocking closure strip 33. As is shown, film lamination 26 extends over bacon product 29 in conforming relationship therewith extending along the edges of the product and outwardly therefrom in adherent contact with bottom film lamination 30 formed from inner lamina 31 composed of a suitable thermoplastic film which will form a peelable or breakaway seal with inner lamina 28. Bottom lamina 32 of bottom film lamination 30 is composed of a suitable oxygen barrier film of the type previously described. The attached closure strips 33, 34 provided outside of the hermetic seal area 35 in addition to providing the reclosable means also facilitate the peeling of upper film lamination 26 when access to the product is desired.

In addition to the above disclosures, the closure strips or profiles of the present invention may be formed out of thermoplastic materials known to be suitable by those skilled in the art such as polyethylene, ethyl-vinyl acetate and polyester. It is also expected that the closure strip profiles may take any form or appearance, i.e. single or a plurality of interlocking rib or groove beads, and that any means of attachment to the laminates is permissible such as by coextruding the profiles onto the packaging films or by adhesive means such as two-sided adhesive tape.

While various embodiments of packages and laminate films embodying the present invention have been described, it will be apparent that certain modifications and variations therefrom may be made without departing from the spirit and scope of this invention. Accordingly, only such limitations are to be imposed thereon as are indicated in the appended claims.

What is claimed is:

1. A reclosable hermetically sealed vacuum package comprising:
   (a) two multi-layered oxygen barrier films having their inner layers in intimate face to face contact with each other forming a hermetic vacuum seal around a vacuum product cavity, each of said films comprising a plurality of layers, the inner layers of said films being of dissimilar composition and being capable of forming a hermetic vacuum peel seal when in intimate contact with each other;
   (b) a food product in said vacuum product cavity;
   (c) a portion of said hermetic vacuum seal on at least one side of the package being a hermetic vacuum peel seal formed between said inner layers; and
   (d) reclosable, flexible, thermoplastic interlocking closure strips attached respectively to said two films peripherally to said hermetic vacuum peel seal, said closure strips comprising one or more interlocking ribs and grooves extending along said one side of said package, said closure strips being adapted to reclose said package after said hermetic vacuum peel seal has been opened; said hermetic vacuum peel seal being of sufficient opening force to withstand processing, handling and shipping and to maintain a vacuum, yet low enough to allow access to the product cavity and to ensure that the structural and functional integrity of the films, closure strips and remaining seals is maintained.

2. A package according to claim 1 wherein the end portions of said closure strips are bonded together such that the interlocking ends of said closure strips remain in intimate engagement.

3. A package according to claim 1 wherein said food product comprises meat.

4. A package according to claim 3 wherein said food product comprises bacon, frankfurters or sliced luncheon meat.

5. A package according to claim 1 wherein said food product comprises cheese.

6. A package according to claim 1 wherein the opening force of said hermetic vacuum peel seal is not greater than about 6 pounds.

7. A package according to claim 1 wherein said interlocking closure strips are attached to the inner layers of said films.

8. A package according to claim 1 wherein said food product is susceptible to deterioration by oxygen.

9. A package according to claim 1 wherein said hermetic vacuum seal closely conforms to the shape of the packaged product.

10. A package according to claim 1 wherein said films are drawn inwardly about the product to conform to the contour thereof.

* * * * *